United States Patent
Andrews

(10) Patent No.: US 11,286,821 B2
(45) Date of Patent: Mar. 29, 2022

(54) EXHAUST SYSTEMS AND METHODS FOR VEHICLES

(71) Applicant: Tiger Tool International Incorporated, Abbotsford (CA)

(72) Inventor: Michael Andrews, Bellingham, WA (US)

(73) Assignee: TIGER TOOL INTERNATIONAL INCORPORATED, Abbotsford (CA)

(*) Notice: Subject to any disclaimer, the term of this patent is extended or adjusted under 35 U.S.C. 154(b) by 0 days.

(21) Appl. No.: 15/734,692

(22) PCT Filed: Jun. 13, 2019

(86) PCT No.: PCT/US2019/037102
§ 371 (c)(1),
(2) Date: Dec. 3, 2020

(87) PCT Pub. No.: WO2019/241595
PCT Pub. Date: Dec. 19, 2019

(65) Prior Publication Data
US 2021/0231038 A1    Jul. 29, 2021

Related U.S. Application Data

(60) Provisional application No. 62/685,139, filed on Jun. 14, 2018.

(51) Int. Cl.
*F01N 3/02* (2006.01)
*F02C 7/32* (2006.01)
*F01N 3/025* (2006.01)

(52) U.S. Cl.
CPC ............... *F01N 3/025* (2013.01); *F02C 7/32* (2013.01); *F01N 2590/08* (2013.01); *F05D 2220/76* (2013.01)

(58) Field of Classification Search
CPC .......... F01N 3/023; F01N 3/025; F01N 3/035; F01N 5/04; F01N 2590/08; F02C 7/32; F05D 2220/76; F02B 37/005; F02B 37/18; F02B 37/10; F02B 41/10; Y02T 10/12
See application file for complete search history.

(56) References Cited

U.S. PATENT DOCUMENTS

| | | | | |
|---|---|---|---|---|
| 7,047,743 B1* | 5/2006 | Stahlhut | ..................... | H02J 3/38 60/608 |
| 8,967,116 B2* | 3/2015 | Leone | ................... | F02D 9/1055 123/399 |
| 2010/0146968 A1* | 6/2010 | Simpson | ............... | F02B 37/001 60/605.2 |
| 2011/0296833 A1* | 12/2011 | Mardberg Jozsa | ... | F02B 37/005 60/605.2 |
| 2014/0007574 A1* | 1/2014 | Pegg | ..................... | F01N 13/009 60/614 |
| 2018/0058287 A1* | 3/2018 | Zhang | ................... | F02B 37/183 |

* cited by examiner

*Primary Examiner* — Audrey B. Walter
*Assistant Examiner* — Dapinder Singh
(74) *Attorney, Agent, or Firm* — Michael R. Schacht; Schacht Law Office, Inc.

(57) ABSTRACT

An exhaust system for a vehicle comprising an engine and a turbine generator comprises an engine exhaust system and a turbine exhaust system. The engine exhaust system comprises an engine exhaust pipe extending from the engine to a desired location relative to the vehicle. The turbine exhaust system comprises a turbine exhaust pipe operatively connected between the turbine generator and the engine exhaust pipe between the engine and the desired location.

9 Claims, 1 Drawing Sheet

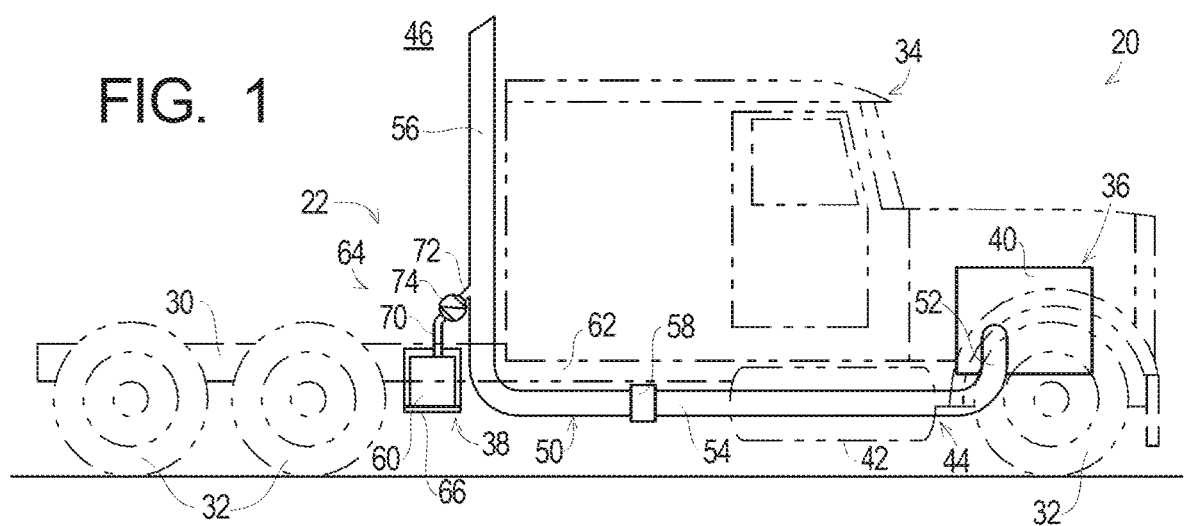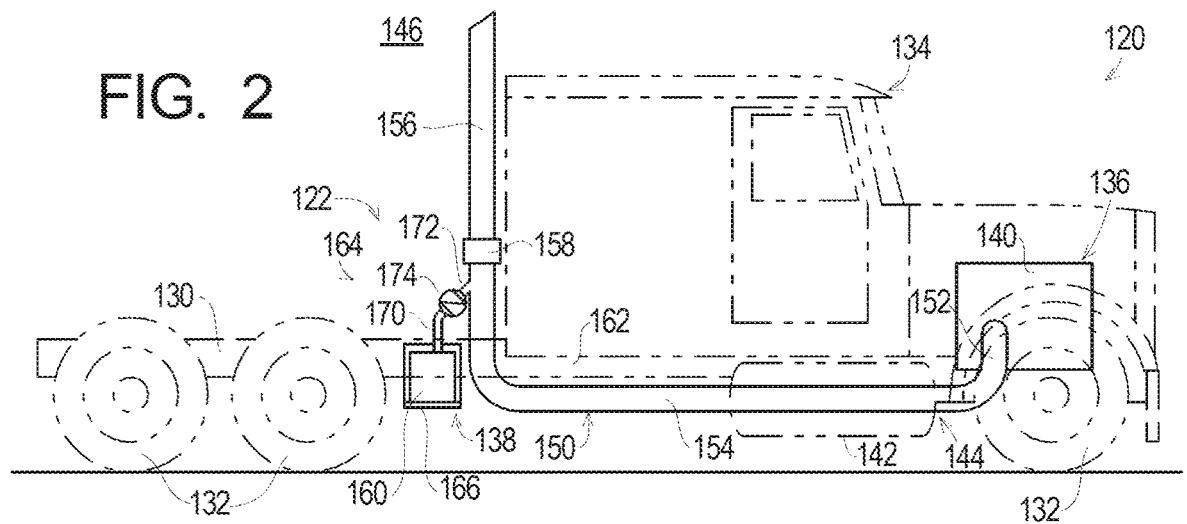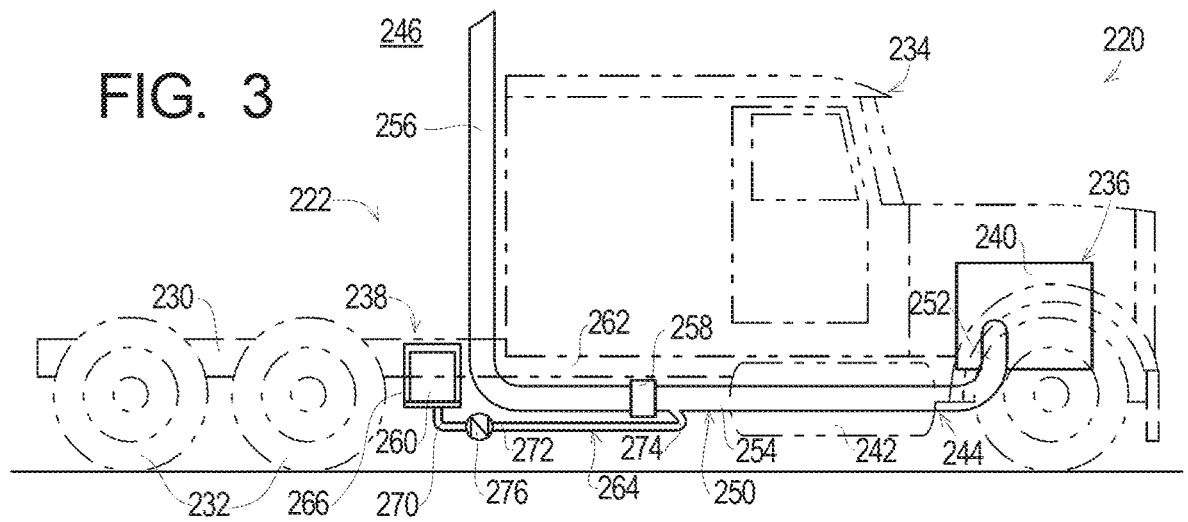

EXHAUST SYSTEMS AND METHODS FOR VEHICLES

RELATED APPLICATIONS

This application, U.S. patent application Ser. No. 15/734,692 is a 371 of International PCT Application No. PCT/US2019/037102 filed Jun. 13, 2019 .

International PCT Application No. PCT/US2019/037102 claims benefit of U.S. Provisional Application Ser. No. 62/685,139 filed Jun. 14, 2018 .

The contents of all related applications are incorporated herein by reference.

TECHNICAL FIELD

The present invention relates to vehicle exhaust systems and methods and, in particular, to exhaust systems and methods for vehicle mounted turbine engines.

BRIEF DESCRIPTION OF THE DRAWINGS

FIG. 1 is a somewhat schematic perspective view of a first example vehicle of the present invention;

FIG. 2 is a somewhat schematic perspective view of a second example vehicle of the present invention; and FIG. 3 is a somewhat schematic perspective view of a third example vehicle of the present invention.

SUMMARY

The present invention may be embodied as an exhaust system for a vehicle comprising an engine and a turbine generator comprising an engine exhaust system and a turbine exhaust system. The engine exhaust system comprises an engine exhaust pipe extending from the engine to a desired location relative to the vehicle. The turbine exhaust system comprises a turbine exhaust pipe operatively connected between the turbine generator and the engine exhaust pipe between the engine and the desired location.

The present invention may also be embodied as a vehicle comprising an engine, an engine exhaust system, a turbine generator, and a turbine exhaust system. The engine exhaust system extends from the engine to a desired location. The turbine exhaust system is arranged between the turbine generator and the engine exhaust pipe between the engine and the desired location.

The present invention may also be embodied as a method of removing exhaust from an engine and a turbine generator mounted on a vehicle comprising the following steps. An engine exhaust pipe is arranged to extend from the engine to a desired location relative to the vehicle. The turbine exhaust pipe is operatively connected between the turbine generator and the engine exhaust pipe between the engine and the desired location.

DETAILED DESCRIPTION

The present invention may take a number of forms, and first, second, and third examples of vehicle exhaust systems of the present invention will be described separately below.

In the following discussion, the term "front" refers to the direction of normal travel of the vehicle, while the term "rear" refers to the direction opposite the direction of normal travel of the vehicle. The terms "above" and "below" are relative to the vehicle during normal use. The term "upstream" refers to the direction in which exhaust flows through a pipe, and the term "downstream" refers to the direction opposite of the direction in which exhaust flows through a pipe.

I. First Example Vehicle Exhaust System

Referring initially to FIG. 1 of the drawing, depicted at 20 therein is a first example vehicle 20 comprising a first example exhaust system 22 constructed in accordance with, and embodying, the principles of the present invention.

The vehicle 20 is or may be conventional. The first example vehicle 20 is a tractor of the type commonly used to move a commercial trailer (not shown). The present invention may be used in conjunction with other types of vehicles that employ an internal combustion engine and may be configured to use an auxiliary power source. Examples of other vehicles in connection with which the present invention may be used include vessels such as ships, construction vehicles such as bulldozers, and specialized military vehicles. The present invention, in some forms, is of particular significance when used with vehicles having a diesel engine, and that example of the present invention will be described in detail below.

FIG. 1 illustrates that the first example vehicle 20 comprises a frame 30 and wheels 32, a cab 34, an engine system 36, and a generator system 38 supported by the frame 30.

The example engine system 36 comprises an engine 40, a fuel tank 42, and a first example engine exhaust system 44. The engine 40 is operatively connected to the fuel tank 42 such that the engine 40 burns fuel burns stored in the fuel tank 42. The engine 40 is further operatively connected to the wheels 32 such that, when the engine 40 burns fuel from the fuel tank 42, the engine 40 causes the wheels 32 to rotate and thereby displace the first example vehicle 20. The engine 40 is further operatively connected to the first example engine exhaust system 44 such that diesel exhaust generated by combustion of fuel within the engine 40 is directed to a desired location 46 that is spaced from the engine 40 and, typically, located above and behind the cab 34 as will be described in further detail below. Diesel exhaust typically includes gasses and particulate matter.

In particular, the first example engine exhaust system 44 comprises an engine exhaust pipe 50 comprising first, second, and third engine exhaust pipe portions 52, 54, and 56 and a diesel particulate filter (DPF) 58. The first engine exhaust pipe portion 52 is connected to the engine 40 and the second engine exhaust pipe portion 54 such that exhaust is initially channeled below the engine 40. The example second engine exhaust portion 54 horizontally extends towards the rear of the vehicle below the cab 34 to the third engine exhaust portion 56. The example third engine exhaust portion 56 extends vertically up behind cab 34 to the desired location 46. In the first example vehicle exhaust system 44, the DPF 58 is arranged in the second engine exhaust pipe portion 54. During normal operation of the engine system 36, the DPF 58 removes particulate matter from the stream of exhaust flowing from the engine 40 and through the first example vehicle exhaust system 44. The DPF thus substantially prevents the introduction of diesel exhaust particulates at the desired location 46.

The example generator system 38 comprises a turbine generator 60, a secondary fuel line 62, a first example turbine exhaust system 64, and a turbine housing 66. The secondary fuel line 62 is operatively connected between the turbine generator 60 and the fuel tank 42 to allow the turbine generator 60 to combust fuel stored in the fuel tank 42. The first example turbine exhaust system 64 is operatively connected to the turbine generator 60 such that turbine exhaust generated by combustion of fuel within the turbine generator 60 is directed to the desired location 46 as will be described in further detail below. The example desired location 46 is thus spaced from the turbine generator 60. The example turbine housing 66 is supported by the vehicle frame 30 immediately behind the cab 34. The example turbine housing 66 in turn supports the turbine generator 60.

The first example turbine exhaust system 64 comprises first and second turbine exhaust pipe portions 70 and 72. The first turbine exhaust pipe portion 70 is connected to the turbine generator 60 and the second engine exhaust pipe portion 72 such that exhaust is initially channeled away from the turbine generator 60. In particular, the example second engine exhaust portion 72 is configured to channel turbine exhaust into the third engine exhaust portion 56. During normal operation of the generator system 38, turbine exhaust is introduced into the example engine exhaust system 44 between the engine 40 and desired location 46. In the first example turbine exhaust system 64, turbine exhaust is introduced into the example engine exhaust system 44 downstream of the DPF 58. The first example turbine exhaust system 64 thus directs heat and turbine exhaust to a location above and behind the cab 34. A check valve 74 may be arranged in the turbine exhaust system 64 to prevent back flow of diesel exhaust into the turbine generator 60 through the second example turbine exhaust system 64.

II. Second Example Vehicle Exhaust System

Referring now to FIG. 2 of the drawing, depicted at 120 therein is a second example vehicle 120 comprising a second example exhaust system 122 constructed in accordance with, and embodying, the principles of the present invention.

The vehicle 120 is or may be conventional. The second example vehicle 120 is a tractor of the type commonly used to move a commercial trailer (not shown). The present invention may be used in conjunction with other types of vehicles that employ an internal combustion engine and may be configured to use an auxiliary power source. Examples of other vehicles in connection with which the present invention may be used include vessels such as ships, construction vehicles such as bulldozers, and specialized military vehicles. The present invention, in some forms, is of particular significance when used with vehicles having a diesel engine, and that example of the present invention will be described in detail below.

FIG. 2 illustrates that the second example vehicle 120 comprises a frame 130 and wheels 132, a cab 134, an engine system 136, and a generator system 138 supported by the frame 130.

The example engine system 136 comprises an engine 140, a fuel tank 142, and a second example engine exhaust system 144. The engine 140 is operatively connected to the fuel tank 142 such that the engine 140 burns fuel burns stored in the fuel tank 142. The engine 140 is further operatively connected to the wheels 132 such that, when the engine 140 burns fuel from the fuel tank 142, the engine 140 causes the wheels 132 to rotate and thereby displace the second example vehicle 120. The engine 140 is further operatively connected to the second example engine exhaust system 144 such that diesel exhaust generated by combustion of fuel within the engine 140 is directed to a desired location 146 that is spaced from the engine 140 and, typically, located above and behind the cab 134 as will be described in further detail below. Diesel exhaust typically includes gasses and particulate matter.

In particular, the second example engine exhaust system 144 comprises an engine exhaust pipe 150 comprising first, second, and third engine exhaust pipe portions 152, 154, and 156 and a diesel particulate filter (DPF) 158. The first engine exhaust pipe portion 152 is connected to the engine 140 and the second engine exhaust pipe portion 154 such that exhaust is initially channeled below the engine 140. The example second engine exhaust portion 154 horizontally extends towards the rear of the vehicle below the cab 134 to the third engine exhaust portion 156. The example third engine exhaust portion 156 extends vertically up behind cab 134 to the desired location 146. In the second example vehicle exhaust system 144, the DPF 158 is arranged in the third engine exhaust pipe portion 154. During normal operation of the engine system 136, the DPF 158 removes particulate matter from the stream of exhaust flowing from the engine 140 and through the second example vehicle exhaust system 144. The DPF thus substantially prevents the introduction of diesel exhaust particulates at the desired location 146.

The example generator system 138 comprises a turbine generator 160, a secondary fuel line 162, a second example turbine exhaust system 164, and a turbine housing 166. The secondary fuel line 162 is operatively connected between the turbine generator 160 and the fuel tank 142 to allow the turbine generator 160 to combust fuel stored in the fuel tank 142. The second example turbine exhaust system 164 is operatively connected to the turbine generator 160 such that turbine exhaust generated by combustion of fuel within the turbine generator 160 is directed to the desired location 146 as will be described in further detail below. The example desired location 146 is thus spaced from the turbine generator 160. The example turbine housing 166 is supported by the vehicle frame 130 immediately behind the cab 134. The example turbine housing 166 in turn supports the turbine generator 160.

The second example turbine exhaust system 164 comprises first and second turbine exhaust pipe portions 170 and 172. The first turbine exhaust pipe portion 170 is connected to the turbine generator 160 and the second engine exhaust pipe portion 172 such that exhaust is initially channeled away from the turbine generator 160. In particular, the example second engine exhaust portion 172 is configured to channel turbine exhaust into the third engine exhaust portion 156 upstream of the DPF 158. During normal operation of the generator system 138, turbine exhaust is introduced into the example engine exhaust system 144 between the engine 140 and the desired location 146 and upstream of the DPF 158.

The second example turbine exhaust system 164 thus directs heat and turbine exhaust to a location above and behind the cab 134. A check valve 174 may be arranged in the turbine exhaust system 164 to prevent back flow of diesel exhaust into the turbine generator 160 through the second example turbine exhaust system 164.

Further, heat in the turbine exhaust flows into the DPF 158. The heat in the turbine exhaust removes accumulated particulate matter or prevents the build-up of particulate within DPF such that the DPF is regenerated whenever the turbine generator 160 is operating. Exhaust heat from the turbine generator 160 thus functions to regenerate the DPF 158 during normal operation of the turbine generator 160 to generate electricity, or the turbine generator 160 may be operated specifically for the purpose of regenerating the DPF 158.

III. Third Example Vehicle Exhaust System

Referring now to FIG. 3 of the drawing, depicted at 220 therein is a third example vehicle 220 comprising a third example exhaust system 222 constructed in accordance with, and embodying, the principles of the present invention.

The vehicle 220 is or may be conventional. The third example vehicle 220 is a tractor of the type commonly used to move a commercial trailer (not shown). The present invention may be used in conjunction with other types of vehicles that employ an internal combustion engine and may be configured to use an auxiliary power source. Examples of other vehicles in connection with which the present invention may be used include vessels such as ships, construction vehicles such as bulldozers, and specialized military vehicles. The present invention, in some forms, is of particular significance when used with vehicles having a diesel engine, and that example of the present invention will be described in detail below.

FIG. 3 illustrates that the third example vehicle 220 comprises a frame 230 and wheels 232, a cab 234, an engine system 236, and a generator system 238 supported by the frame 230.

The example engine system 236 comprises an engine 240, a fuel tank 242, and a third example engine exhaust system 244. The engine 240 is operatively connected to the fuel tank 242 such that the engine 240 burns fuel burns stored in the fuel tank 242. The engine 240 is further operatively connected to the wheels 232 such that, when the engine 240 burns fuel from the fuel tank 242, the engine 240 causes the wheels 232 to rotate and thereby displace the third example vehicle 220. The engine 240 is further operatively connected to the third example engine exhaust system 244 such that diesel exhaust generated by combustion of fuel within the engine 240 is directed to a desired location 246 that is spaced from the engine 240 and, typically, located above and behind the cab 234 as will be described in further detail below. Diesel exhaust typically includes gasses and particulate matter.

In particular, the third example engine exhaust system 244 comprises an engine exhaust pipe 250 comprising first, second, and third engine exhaust pipe portions 252, 254, and 256 and a diesel particulate filter (DPF) 258. The first engine exhaust pipe portion 252 is connected to the engine 240 and the second engine exhaust pipe portion 254 such that exhaust is initially channeled below the engine 240. The example second engine exhaust portion 254 horizontally extends towards the rear of the vehicle below the cab 234 to the third engine exhaust portion 256. The example third engine exhaust portion 256 extends vertically up behind cab 234 to the desired location 246. In the third example vehicle exhaust system 244, the DPF 258 is arranged in the second engine exhaust pipe portion 254 below the cab 234. During normal operation of the engine system 236, the DPF 258 removes particulate matter from the stream of exhaust flowing from the engine 240 and through the third example vehicle exhaust system 244. The DPF thus substantially prevents the introduction of diesel exhaust particulates at the desired location 246.

The example generator system 238 comprises a turbine generator 260, a secondary fuel line 262, a third example turbine exhaust system 264, and a turbine housing 266. The secondary fuel line 262 is operatively connected between the turbine generator 260 and the fuel tank 242 to allow the turbine generator 260 to combust fuel stored in the fuel tank 242. The third example turbine exhaust system 264 is operatively connected to the turbine generator 260 such that turbine exhaust generated by combustion of fuel within the turbine generator 260 is directed to the desired location 246 as will be described in further detail below. The example desired location 246 is thus spaced from the turbine generator 260. The example turbine housing 266 is supported by the vehicle frame 230 immediately behind the cab 234. The example turbine housing 266 in turn supports the turbine generator 260.

The third example turbine exhaust system 264 comprises first, second, and third turbine exhaust pipe portions 270, 272, and 274. The first turbine exhaust pipe portion 270 is connected to the turbine generator 260, and the third engine exhaust pipe portion 274 is connected to the third example engine exhaust system 244. The example second turbine exhaust system 272 is connected between the first turbine exhaust portion 270 and the third turbine exhaust portion 274 such that exhaust is channeled away from the turbine generator 260 and into the third example engine exhaust system. In particular, the example second engine exhaust portion 272 is configured to channel turbine exhaust into the second engine exhaust portion 256 upstream of the DPF 258. During normal operation of the generator system 238, turbine exhaust is introduced into the example engine exhaust system 244 between the engine 240 and the desired location 246 upstream of the DPF 258.

The third example turbine exhaust system 264 thus directs heat and turbine exhaust to a location above and behind the cab 234. A check valve 376 may be arranged in the turbine exhaust system 264 to prevent back flow of diesel exhaust into the turbine generator 260 through the third example turbine exhaust system 264.

Further, heat in the turbine exhaust flows into the DPF 258. The heat in the turbine exhaust removes accumulated particulate matter or prevents the build-up of particulate within DPF such that the DPF is regenerated whenever the turbine generator 260 is operating. Exhaust heat from the turbine generator 260 thus functions to regenerate the DPF 258 during normal operation of the turbine generator 260 to generate electricity, or the turbine generator 260 may be operated specifically for the purpose of regenerating the DPF 258.

What is claimed is:

1. An exhaust system for a vehicle comprising an engine, a fuel tank, and a turbine generator operatively connected to the fuel tank comprising:
   an engine exhaust system comprising an engine exhaust pipe extending from the engine to a desired location relative to the vehicle; and
   a turbine exhaust system comprising a turbine exhaust pipe operatively connected between the turbine generator and the engine exhaust pipe between the engine and the desired location; whereby
   turbine exhaust generated by combustion of fuel within the turbine generator is channeled to the engine exhaust pipe between the engine and the desired location.

2. An exhaust system as recited in claim 1, further comprising a diesel particulate filter arranged in the engine exhaust pipe, where the turbine exhaust pipe is operatively connected between the turbine generator and the engine exhaust pipe upstream of the diesel particulate filter.

3. An exhaust system as recited in claim 1, further comprising a diesel particulate filter arranged in the engine exhaust pipe, where the turbine exhaust pipe is operatively connected between the turbine generator and the engine exhaust pipe downstream of the diesel particulate filter.

4. A vehicle comprising:
   an engine;
   an engine exhaust system comprising an engine exhaust pipe extending from the engine to a desired location;
   a fuel tank;
   a turbine generator operatively connected to the fuel tank; and a turbine exhaust system arranged between the turbine generator and the engine exhaust pipe between the engine and the desired location such that turbine exhaust generated by combustion of fuel within the turbine generator is channeled to the engine exhaust pipe between the engine and the desired location.

5. A vehicle as recited in claim 4, further comprising a diesel particulate filter arranged in the engine exhaust system, where the turbine exhaust pipe is operatively connected between the turbine generator and the engine exhaust system upstream of the diesel particulate filter.

6. A vehicle as recited in claim 4, further comprising a diesel particulate filter arranged in the engine exhaust system, where the turbine exhaust pipe is operatively connected between the turbine generator and the engine exhaust system downstream of the diesel particulate filter.

7. A method of removing exhaust from an engine and a turbine generator mounted on a vehicle comprising a fuel tank, the method comprising the steps of:
   arranging an engine exhaust pipe to extend from the engine to a desired location relative to the vehicle;
   operatively connecting a turbine exhaust pipe between the turbine generator and the engine exhaust pipe between the engine and the desired location; and
   causing the turbine generator to combust fuel from the fuel tank such that turbine exhaust generated by combustion of fuel within the turbine generator is channeled to the engine exhaust pipe between the engine and the desired location.

8. A method as recited in claim 7, further comprising the steps of:
   arranging a diesel particulate filter in the engine exhaust pipe; and
   operatively connecting the turbine exhaust pipe between the turbine generator and the engine exhaust pipe upstream of the diesel particulate filter.

9. A method as recited in claim 7, further comprising the steps of:
   arranging a diesel particulate filter in the engine exhaust pipe; and
   operatively connecting the turbine exhaust pipe between the turbine generator and the engine exhaust pipe downstream of the diesel particulate filter.

\* \* \* \* \*